United States Patent Office 2,900,115
Patented Aug. 18, 1959

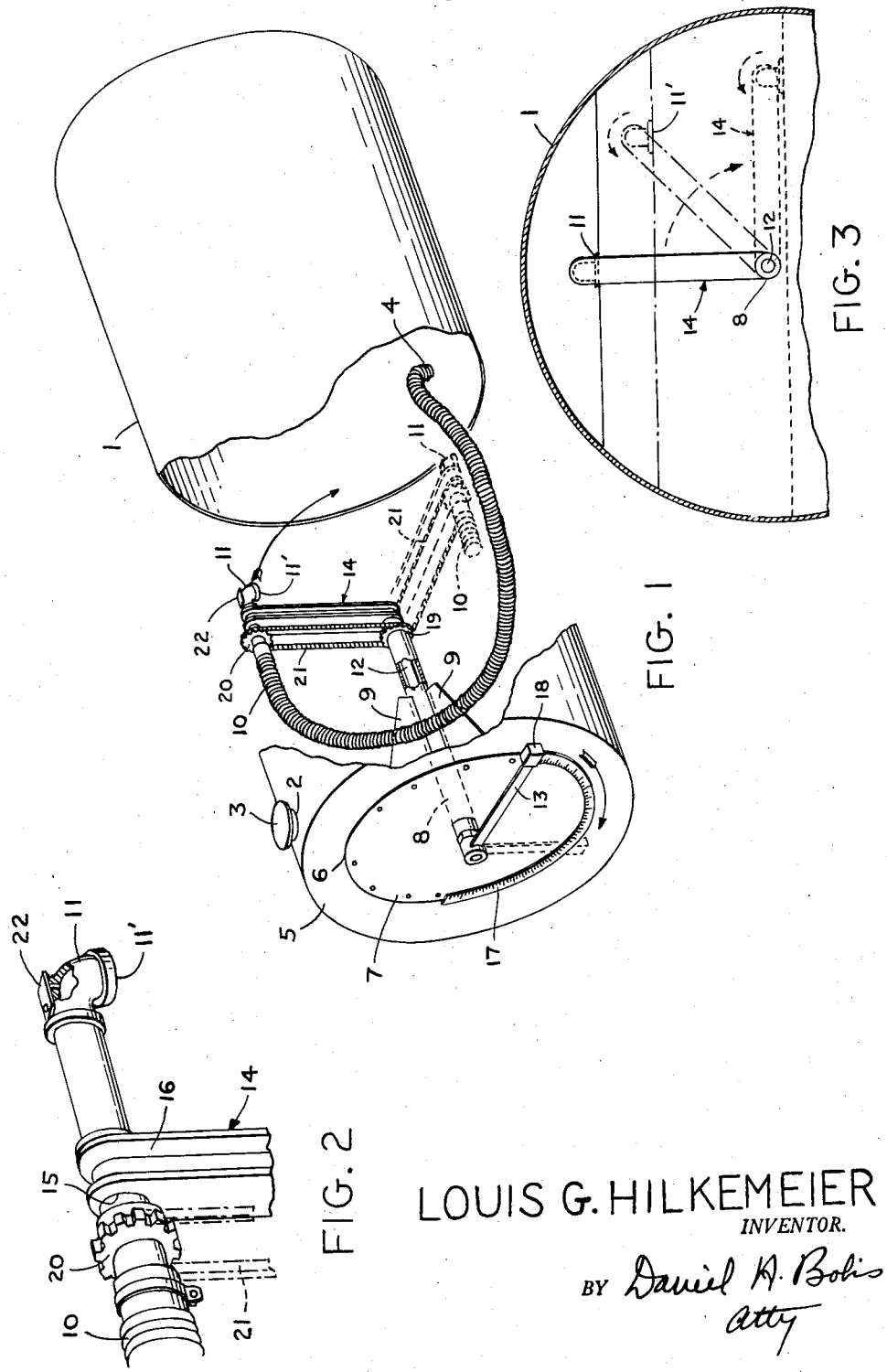

2,900,115

LIQUID MEASURING DEVICE

Louis G. Hilkemeier, Plainfield, N.J., assignor to Worthington Corporation, Harrison, N.J., a corporation of Delaware Application May 24, 1957, Serial No. 661,364

1 Claim. (Cl. 222—416)

The present invention relates to liquid measuring devices, and more particularly to means therefor to enable more accurate measuring of the liquid dispensed by these devices.

The invention is particularly useful for a liquid measuring device used to deliver a measured quantity of water to a mixing device, such as a concrete mixer drum. Since the water-cement ratio largely determines the structural strength of the concrete, it is essential that the quantity of water delivered by the measuring device be controlled within very accurate limits.

A typical prior art liquid measuring device for this purpose generally consists of a siphon head, which is part of a siphon discharge passage of a water storage tank, and which is adapted to be raised or lowered within the tank to determine the measured quantity of water to be withdrawn from the tank. In these devices, the usual method employed to raise or lower the siphon head is to rotate the siphon head about a fixed axis within the tank. However, in rotating the siphon head, as it passes from one position to another, the angle of inclination of the siphon head opening changes, thus making the point of suction loss of the siphon a complex variable throughout the arc traversed by the siphon head. This in turn, makes it difficult to accurately measure the quantity of water withdrawn from the tank by the siphon.

Accordingly, it is an object of the present invention to provide means for maintaining the siphon head, and thus the siphon head opening, in the same relative position in all its positions of rotation about the fixed axis.

A further object is to adapt this means to be automatically operative upon rotation of the siphon head.

To accomplish these objects, the siphon head is provided with means which causes a rotation of the siphon head itself in a direction always opposite the direction in which the siphon head is rotated about the fixed axis. Thus, for example, when the siphon head is rotated in a clockwise direction about the fixed axis, the siphon head is caused to rotate in a counter-clockwise direction about its own axis. The rotation of the siphon head about its own axis thus compensates for the angle of rotation of the siphon about the fixed axis. In this way, the siphon head opening is continuously maintained in the same relative position in all its positions of rotation about the fixed axis.

The invention will be better understood when considered in connection with the accompanying specification and drawings forming a part thereof, in which:

Figure 1 is a view, partly broken away, of the liquid measuring device constituting the present invention.

Figure 2 is a detailed view of the siphon head.

Figure 3 is a diagrammatic representation of the siphon head in several vertical positions.

Referring to Figure 1, the liquid measuring device is shown having a cylindrically-shaped liquid storage tank generally designated 1. In practice, this tank is suitably mounted on a supporting frame (not shown) above a concrete mixer drum (not shown), and water stored in the tank is delivered in measured quantities by a siphon within the tank to the concrete mixer drum. The tank 1 has an inlet 2 on top, which can be closed when desired by a filler cap 3, and a discharge outlet 4 in its bottom. In the left end portion 5 of the tank 1, looking at Figure 1, an opening 6 is provided in which the supporting structure for the siphon used within the tank 1 is suitably mounted.

This supporting structure consists of a circular plate 7 and a hollow tubular element 8 fixed to extend within the tank 1 from the center of the circular plate 7. A number of circumferentially spaced triangular plates 9 are suitably connected to the inner side of the plate 7 and also lengthwise along a portion of the tubular element 8 to lend support to the tubular element 8 in its extended position within the tank 1.

The siphon used within the tank 1 consists of a hollow flexible tubing 10 connected at one end to the tank discharge outlet 4, and a siphon head 11 connected to the other end of the tubing 10. A suitable air vent valve 22 is provided in the top of the siphon head 11 through which air trapped in the tubing 10 is permitted to escape when the said tubing 10 fills with water. According to the known principle of operation of the siphon, the siphon head 11 is rotated about the tubular element 8 to vary its vertical position within the tank 1. In this way, a quantity of water which can be measured, is siphoned through the siphon head 11 and tubing 10 until the water level in the tank falls to the level of the siphon head 11, and the siphon suction pressure is lost.

To carry out this method of varying the vertical position of the siphon head 11 within the tank 1, an elongated cylindrical shaft 12 is rotatably disposed within the hollow tubular element 8. Keyed to the left end of this shaft 12 is a calibration arm 13. Keyed to the right end of the shaft 12, and 90 degrees out of phase with the calibration arm 13, is another arm, generally designated 14. As most clearly shown in Figure 2, the siphon head 11 is rotatably mounted in an opening 15 in the distal end 16 of this arm 14. Thus, when the calibration arm 13 is moved to the position indicated in phantom view in Figure 1, the siphon head 11 is rotated by the arm 14 about the tubular element 8 to the lower vertical position also indicated in phantom view. A half circle calibration strip 17 is suitably mounted to the left end of the tank 1 along the arc moved through by the traversing end of the calibration arm 13 for measuring the quantity of water that will be withdrawn by the siphon; and a locking device 18 is provided to lock the traversing end of the calibration arm 13 to the calibration strip 17 at any desired point.

As the siphon head 11 is rotated about the tubular element 8 from one position to another, it is desirable to eliminate any change in the angle of inclination of the inlet 11' of the siphon head 11. Otherwise, each point at which the siphon suction pressure is lost throughout the arc traversed by the siphon head 11 will be too complex to determine, and thus will prevent accurate measurement of the quantity of water siphoned from the tank 1. For this reason, a pair of sprocket gears 19 and 20, and an endless sprocket chain 21 are provided to rotate the siphon head 11 about its own axis to compensate for the angle of rotation of the siphon head 11 about the tubular element 8.

The sprocket gear 19 is fixedly mounted about the innermost end of the tubular element 8, and the sprocket gear 20 is mounted about the siphon head 11. The endless sprocket chain 21 is looped about the sprocket gears in engagement with the teeth of these gears. Thus, as the siphon head 11 is rotated from its uppermost position to its intermedaite positions, or in a clockwise direction looking at Figure 3, the siphon head 11 is caused to rotate by the sprocket chain 22 about its own axis in a counter-clockwise direction. This compensating rotation by the siphon head 11 continuously maintains the siphon head inlet 11' in the same relative position in all positions of rotation of the siphon head 11 about the tubular element 8.

It will be understood that the invention is not to be limited to the specific construction or arrangement of parts shown, but that they may be widely modified within the invention defined by the claim.

What is claimed is:

In a liquid measuring device, a liquid storage tank having an inlet and an outlet therein, a siphon tube within the tank connected at one end to the tank outlet, a siphon head connected to the opposite end of the siphon tube, a hollow tubular element extending into the tank from one end thereof, a shaft rotatably disposed in the tubular element and having an arm extending from one end thereof, said arm provided with an opening in one end for rotatably receiving the siphon head, a stationary sprocket gear on the tubular element, a sprocket gear on the rotatable siphon head, and a closed loop chain about the sprocket gears, whereby as the siphon head is rotated in one direction about the tubular element to draw off varying quantities of liquid from the said storage tank, the chain causes rotation of the siphon head about its own axis in an opposite direction to maintain a substantially constant siphon head angular position.

References Cited in the file of this patent

UNITED STATES PATENTS

| | | |
|---|---|---|
| 1,291,280 | Upham | Jan. 14, 1919 |
| 2,489,039 | Law | Nov. 22, 1949 |
| 2,495,944 | Pletta et al. | Jan. 31, 1950 |
| 2,578,000 | Cronk | Dec. 11, 1951 |